G. SUMNER.
SUPPLEMENTARY SPRING FOR VEHICLES.
APPLICATION FILED OCT. 4, 1912.
1,068,020.
Patented July 22, 1913.
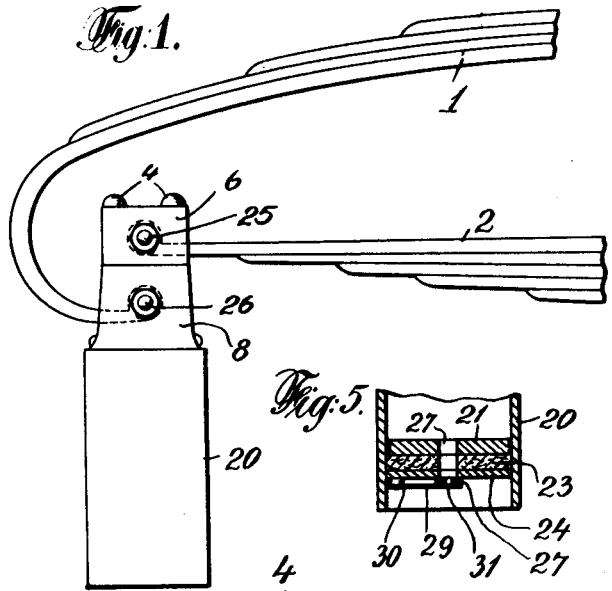
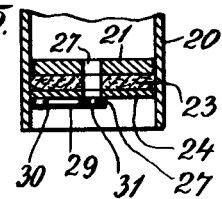
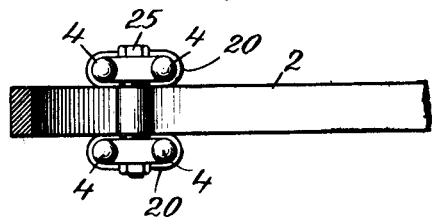
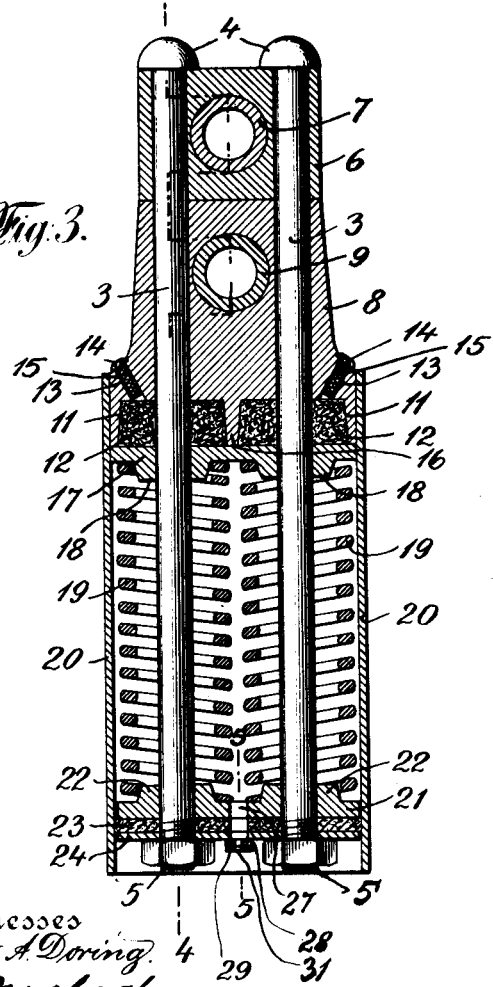
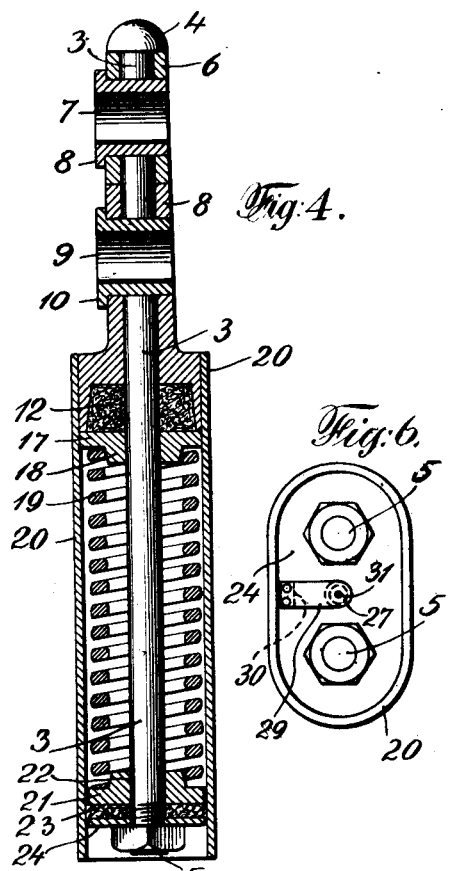
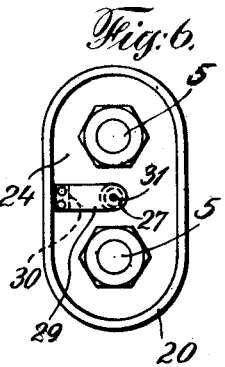
Witnesses
Max B. A. Doring
F. M. Ousback
Inventor
George Sumner
By Attorneys
Phillips Abbott

UNITED STATES PATENT OFFICE.

GEORGE SUMNER, OF NEW YORK, N. Y.

SUPPLEMENTARY SPRING FOR VEHICLES.

1,068,020.　　　　Specification of Letters Patent.　　Patented July 22, 1913.

Application filed October 4, 1912. Serial No. 723,831.

*To all whom it may concern:*

Be it known that I, GEORGE SUMNER, a subject of the Kingdom of Great Britain, and a resident of the borough of Manhattan, city, county, and State of New York, have invented certain new and useful improvements in supplementary springs for vehicles, more particularly intended for use in automobile construction and which are used to connect the ends of the elliptic or leaf springs which constitute the spring system proper of the vehicle.

It is the purpose of this invention to improve devices of the class stated in the following particulars: First, to supply compactness in structure and attractiveness in design. Second, to provide lubricating devices for the sliding members of the structure. Third, to securely hold the spiral springs in proper relation to the other parts of the structure. Fourth, to provide instrumentalities whereby an air cushioning effect is secured auxiliary to the cushioning effect of the springs and the rebound of the car body pneumatically controlled. Fifth, to increase the length of the bearing surface of the moving parts. Sixth, the employment of interchangeable bushings in the supporting blocks of the structure, thus adapting the device to the spring systems of cars of different sizes and makes. Seventh, the arrangement of the parts so that all strains are applied in direct line instead of on offset lines.

Other advantages also result from my improved construction, which will be apparent from the description below.

I illustrate the invention as applied to an automobile. Obviously with appropriate changes, it is equally well adapted to other vehicles.

Referring to the drawings, Figure 1 illustrates a side elevation of the terminals of the elliptic springs of an automobile with my supplemental spring device in position; Fig. 2 illustrates a plan view, partly in section, of that which is shown in Fig. 1; Fig. 3 illustrates a sidewise vertical sectional view of the invention, the guide rods and the nuts and heads thereof being shown in elevation; Fig. 4 illustrates an edgewise vertical sectional view of the invention taken on the lines 4—4 of Fig. 3, one of the guide rods with its nut and head being shown in elevation; Fig. 5 illustrates a vertical sectional view on the line 5—5 of Fig. 3, of the guide rods and adjoining parts, showing the air-controlling valve; Fig. 6 illustrates a plan view, taken from beneath, of the parts shown in Figs. 3 and 5.

Referring to Figs. 1 and 2, 1 represents the rear end of an upper semi-elliptic spring which is attached in any desired manner to the body of the automobile. 2 similarly represents the rear end of a lower semi-elliptic spring attached to the axle in any usual manner.

Referring now to Figs. 3 and 4, 3, 3, are guide rods. They are headed at their upper ends, as at 4, 4, and are provided with screw threads and nuts 5, 5, at their lower ends. 6 is an upper block through which the guide rods pass. It is fixed upon these rods. 7 is a bushing, preferably provided with a flange 8 (see Fig. 4) which is removable from the block 7, although snugly fitting therein, so that bushings having a larger or smaller opening may be substituted therefor, thus adapting the device to use upon automobiles or springs of different sizes or makes. 8 is the lower or movable block. It likewise is provided with a bushing 9 similar to the bushing 7, having a flange 10 and is also removable for substitution by other bushings. The block 8 is provided on its under surface with two recesses 11, 11, through which the guide rods 3 pass and these recesses are provided with absorbent material 12, such as felt or packing, adapted to receive and hold a suitable lubricant which may be introduced into the chambers 12, 12, through tubes 13, 13, provided with suitable closure which may be ball valves 14, 14, which are automatically closed by springs 15, 15, which normally tend to reseat the balls. The oil is introduced by pressure exerted upon the balls by the nozzle of the oil can, in a manner well understood. 16 is a partition dividing the two recesses 12, 12, which, however, may be omitted, if preferred, and 17 is a metallic plate provided with lugs 18 on its under side, which are adapted to fit inside of the springs 19, which normally exert their pressure upwardly against the plate 17, thus closing the chambers 11 and holding the packing 12 in place therein. 20 is a metallic casing or shell which is rigidly fastened at its upper end to the block 8, the joint being preferably so perfect as to be air tight, or substantially so. At the lower ends of the rods is another plate 21 similar to the plate 17 and it also is provided with upwardly extending lugs 22 which, entering the lower end of the springs 19, center them and hold them in position. 23 is a packing of felt or similar material which is held firmly against the under side of the plate 21 by a steel disk or its equivalent, 24, which is held upon the ends of the guide rods 3 by the nuts 5 above explained.

In the rapid running of cars, the jolts and jars occasioned by roughnesses on the roadbed are often very severe because of the rebound due to the upward thrust given to the car body by the reaction of the spring system. In order to obviate this, I sometimes add the following features: I make an opening 27 through the plate 21, the packing 23 and the bottom plate 24. This hole is of such size as to allow ready escape of the air from the interior of the casing during the compression thereof and yet its size is preferably such as to retard the escape of the air to a degree so that the pneumatic or air cushioning effect may be secured in aid of the springs. 28 is a valve made of any suitable material, supported on a spring bar 29 which may well be fastened to a block 30, which is preferably riveted to the plate 24. A hole 31 is made through the valve in line with the larger hole 27. It is of such size as will regulate and control the return of the air to the interior of the casing, retarding it for a period of say five or ten seconds, more or less.

The assemblage of the parts is as follows: The extreme ends of the springs 1 and 2 are fashioned into eyes, as is well known. A pair of my spring devices, as shown in Fig. 2, is arranged one pair on each side of the spring terminals as shown in Fig. 2. A bolt 25 provided with suitable nuts and washers is then passed through the bushings 7 in the upper or removable blocks 6 on both sides of the spring and the nuts are screwed up until the parts attain suitable snugness of fit. Similarly a bolt 26 is passed through the bushings 9 of the removable blocks 8 on each side of the spring and likewise screwed up until the necessary snugness is secured. Thereupon the oil being supplied to the packing in the chambers 12 through the valves 14 in the manner described, the apparatus is ready for use and its operation is as follows: The pressures exerted by the weight of the vehicle body plus its load, if any, will be exerted through the spring 1 upon the lower or sliding block 8, tending to depress it and since the upper or removable block 6 is supported by the spring 2, slight separation of these two blocks will normally result because of the compression, more or less, of the springs 19, and when obstructions on the roadbed are encountered, downward sliding of the block 8 over the guide rods 3 results and this movement, whatever its extent may be, will be smooth and noiseless because of the lubrication applied to the guide rods and also because of the length of bearing between the sliding blocks 8 and the guide rods plus the fact that as the block 8 moves downwardly, compressing the springs 19, there is also brought into action an air cushioning effect because the air within the casing 20 is retarded in its escape because of the relatively snug fit of the packing 23 against the interior surface of the casing. This air cushion in a most efficient and admirable manner supplements the resiliency of the springs 19 and gives smoothness and ease to the riding of the vehicle.

The operation of the pneumatic control, as I call it, is as follows: When the sliding block 8 is depressed, resulting of course in a compression of the springs 19 and the reduction of the inclosed space within the casing, the air contained therein escapes through all the joints thereof, but most of it is rapidly expelled through the opening 27. The freedom of its escape will of course depend upon the size of this opening and that will be determined by the size or weight of the car. On the rebound movement, during which the block 8 rises again and the springs 19 are again extended and the inclosed space within the casing 20 returns to normal size, then the air tends to rush back again through the opening 27, but the valve 28 which has been forced off its seat by the compressing or downward movement of the parts, is now, by the resiliency of its supporting bar 29 and also by the suction of the air, clapped back again upon its seat and the only entrance for air, except that which may leak in through the relatively tight fitting joints in the apparatus, is through the reduced opening 31 made in the valve and the size of this opening 31 is regulated according to the size of the supplemental spring structure, so as to retard the rebound, controlling and delaying it, so as to allow five or ten seconds more or less before the parts return to normal positions, thus efficiently preventing jolts and jars.

Another important advantage secured by my construction as compared with others is that the casing 20 with its air tight connection at the upper end with the block 8 and the packing 23 at the bottom effectively prevent the entrance of dust, mud and water to the interior of the casing. Thus the springs and guide rods are kept free from gritty matter which tends to their speedy destruction because of the excessive wear thus engendered. The casing also prevents the formation of ice upon the spiral springs which is apt to interfere with the best operation of the device.

A feature of very great practical importance is the ease with which my supplemental spring devices can be kept clean and attractive in appearance instead of as is the case with most devices of this character known to me, being extremely difficult to cleanse and which frequently present an unsightly appearance. I prefer to make the blocks 6 and 8 of phosphor bronze, the guide rods of vanadium steel and the exterior casing 20 either of cold drawn steel or brass. These parts may be nickel or sliver plated, if desired, and inasmuch as the exterior surfaces throughout are, as shown, smooth, the entire structure can be easily kept cleanly and in a polished handsome condition.

It will be obvious to those who are familiar with this art that modifications may be made in the details of construction without departing from the essentials of the invention. I therefore do not limit myself to the details described and illustrated.

I claim:

1. A supplemental spring device adapted to be combined with the main spring system of the vehicle, comprising a pair of blocks arranged vertically one above the other, each block being perforated transversely for the reception of the bolt of the vehicle spring with which it is engaged, a pair of guide rods immovably fixed in the upper block, upon which rods the lower block slides, an inclosed lubricating chamber in the lower side of the sliding block, a spiral spring surrounding each rod, a substantially air tight casing which incloses the spring, a plate at the lower end of the rods which supports the lower ends of the springs, a packing between said plate and the casing and a valve in the plate which regulates the entrance and exit of air from within the casing.

2. In a vehicle spring the combination of a pair of leaf springs, one connected to the body of the vehicle, the other to the axle, two pairs of supplemental springs interposed between the ends of the leaf springs, each pair of supplemental springs embodying a pair of blocks arranged vertically one above the other, the upper block in each pair of supplemental springs being engaged with the leaf spring supported by the axle, the other block of each pair engaging with the leaf spring attached to the vehicle body, the pair of springs in each supplemental spring being inclosed within a substantially air tight casing, means to lubricate the springs located within the casing and means to regulate the entrance and exit of air from within the casing.

In testimony whereof I have signed my name to this specification in the presence of two subscribing witnesses.

GEORGE SUMNER.

Witnesses:
ROBERT M. FALCONER,
ALFRED ROSS JARMAN.